United States Patent
Imai et al.

(10) Patent No.: US 7,208,856 B2
(45) Date of Patent: Apr. 24, 2007

(54) ELECTRIC ROTATING MACHINE

(75) Inventors: Daisuke Imai, Tokyo (JP); Yoshihito Asao, Tokyo (JP); Masahiko Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/030,908

(22) Filed: Jan. 10, 2005

(65) Prior Publication Data
US 2005/0156480 A1 Jul. 21, 2005

(30) Foreign Application Priority Data
Jan. 19, 2004 (JP) ............................ P2004-010823

(51) Int. Cl.
H02K 1/22 (2006.01)
H02K 1/04 (2006.01)
H01F 1/053 (2006.01)
H01F 41/02 (2006.01)

(52) U.S. Cl. ..................... 310/263; 310/45; 310/156.72
(58) Field of Classification Search ............... 310/263, 310/156.66, 156.72, 8.5, 45; 335/296, 302, 335/303–308; 428/11, 27, 552, 632, 651, 428/693.1; 427/127, 240
See application file for complete search history.

(56) References Cited

U.S. PATENT DOCUMENTS

| | | | |
|---|---|---|---|
| 4,935,080 A * | 6/1990 | Hassell et al. ............... | 156/154 |
| 5,708,316 A * | 1/1998 | Ishida ......................... | 310/184 |
| 5,793,143 A * | 8/1998 | Harris et al. ................. | 310/263 |
| 5,808,381 A * | 9/1998 | Aoyama et al. .............. | 310/12 |
| 5,894,183 A * | 4/1999 | Borchert ..................... | 310/261 |
| 6,211,762 B1 * | 4/2001 | Kikui et al. ................. | 335/302 |
| 6,311,383 B1 * | 11/2001 | Umeda et al. ................ | 29/596 |
| 6,777,097 B2 * | 8/2004 | Hamada et al. ............. | 428/469 |
| 2005/0233068 A1* | 10/2005 | Yoshimura et al. .......... | 427/127 |

FOREIGN PATENT DOCUMENTS

| | | | | |
|---|---|---|---|---|
| JP | 402047807 | * | 2/1990 | ................. 335/296 |
| JP | 402103906 | * | 4/1990 | ................. 335/302 |
| JP | 403280404 | * | 12/1991 | ................. 335/302 |
| JP | 6-46550 A | | 2/1994 | |
| JP | 2548882 B2 | | 8/1996 | |
| JP | 2001-78374 A | | 3/2001 | |

* cited by examiner

*Primary Examiner*—Tran Nguyen
(74) *Attorney, Agent, or Firm*—Sughrue Mion, PLLC

(57) ABSTRACT

Claw-shaped magnetic poles are alternately disposed along the rotation plane of a rotor of an electric rotating machine, and a permanent magnet is disposed between the claw-shaped magnetic poles. Surface of the permanent magnet is coated with a coating layer. The coating layer is composed of a anticorrosive material performing sacrificial anticorrosion (metal flake in a coating film rusts prior to a matrix resulting in protection of the matrix) such as inorganic material containing zinc and a film of the anticorrosive material is formed by spraying. Ionization tendency of zinc is larger than that of iron composing the permanent magnet, and the permanent magnet is difficult to be rusted owing to the sacrificial anticorrosion. Consequently, anticorrosion of the permanent magnet disposed between the claw-shaped magnetic poles is improved.

8 Claims, 6 Drawing Sheets

(a)

(b)

A-A CROSS SECTION

B-B CROSS SECTION

ELECTRIC ROTATING MACHINE

BACKGROUND OF THE INVENTION

1. Field of the Invention

The present invention relates to an electric rotating machine.

2. Description of the Prior Art

In the conventionally electric rotating machines having a field rotor in which a field winding is wound round on a pole core, it has been a known technique that a permanent magnet is mounted between claw-shaped magnetic poles adjacent to each other in circumferential direction of the pole core (as disclosed in, for example, the Specification of Japanese Patent No. 2548882).

The permanent magnet not only reduces leakage flux between the claw-shaped magnetic poles but also increases effective magnetic flux that contributes to power generation by interlinkage of the magnetic flux, thus improving power output of the electric rotating machine. The rotor is arranged to have a ventilation space for separating the permanent magnet and the field winding from each other with a predetermined radial distance, and an air-cooling system introducing outside air is adopted for cooling the rotor. Accordingly, the permanent magnet is necessarily exposed to outside air. For the purpose of protection, it has been popular in the conventional electric rotating machines to apply any coating such as resin coating to the permanent magnet.

In the conventional electric rotating machines of mentioned above arrangement, a problem exists in that, in the process of assembling the rotor, the coating comes off at the time of mounting the permanent magnet or due to mixture of foreign matter from outside or heat deterioration, and the permanent magnet rusts eventually resulting in deterioration of characteristics thereof.

In the conventional electric rotating machines mounted with a permanent magnet, because of its arrangement, the permanent magnet may inhibits airflow inside the rotor, making the cooling efficiency down, and furthermore any reversible or irreversible demagnetization may occur due to temperature rise caused by heat generation of the permanent magnet.

Moreover, because of poor heat conduction of the resin coating, in the conventional electric rotating machines, a further problem exists in that cooling efficiency for the permanent magnet is poor, and temperature of the permanent magnet rises due to heat received from the stator coil and eddy current generated in the permanent magnet, occurring the reversible demagnetization, reducing amount of magnetic flux resulting in deterioration of characteristics, which further brings about reduction in magnetic flux density of the permanent magnet due to opposing magnetic field eventually resulting in irreversible demagnetization.

SUMMARY OF THE INVENTION

The present invention was made to solve the above-discussed problems and has an object of providing an electric rotating machine in which a permanent magnet mounted on a rotor of the electric rotating machine can be prevented from being rusted and the rotor can be prevented from permanent deterioration of characteristics due to irreversible demagnetization, eventually resulting in improvement of the characteristics.

An electric rotating machine according to the present invention includes: a rotor provided with a rotor coil for generating magnetic flux, a pole core comprised of a first pole core and a second pole core respectively provided covering the mentioned rotor coil and each having claw-shaped magnetic poles protruding like an alternate engagement with each other, and a permanent magnet disposed on two sides of said claw-shaped magnetic poles and reducing leakage of magnetic flux between sides of the mentioned claw-shaped magnetic poles adjacent to each other; and a stator disposed oppositely to the mentioned rotor via a space. In this electric rotating machine, the mentioned permanent magnet is coated with an anticorrosive material performing a sacrificial anticorrosion.

In the electric rotating machine of the mentioned arrangement, since the permanent magnet forming the rotor is coated with an anticorrosive material performing a sacrificial anticorrosion, there is an advantage such that the anticorrosive material itself rusts thus the permanent magnet being hardly rusted, and characteristics of the permanent magnet being prevented from deterioration. Another advantage is such that since the permanent magnet is coated with an anticorrosive material, even if the rotor is damaged in the process of assembling the rotor or in the event of mixture of foreign matter from outside, the permanent magnet is hardly rusted. Further, by improving the cooling efficiency for the permanent magnet, it is possible to obtain a rotor capable of preventing temporal lowering of characteristics as well as permanent lowering of characteristics due to irreversible demagnetization, which results in improvement of characteristics as a whole.

Furthermore, in the electric rotating machine according to the invention, the stator winding of the mentioned stator disposed on the outer periphery side of the mentioned rotor is wound twice for each pole and each phase over the whole link.

In the electric rotating machine according to the invention, since the stator winding is wound twice for each pole and each phase, variation in permeance due to stator teeth becomes small and fine, and therefore higher harmonic is reduced. As a result, eddy current is reduced and there is an advantage of preventing permanent deterioration of characteristics due to irreversible demagnetization.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1.

An electric rotating machine according to Embodiment 1 of the present invention is hereinafter described with reference to FIGS. 1 to 3.

Figure 1:
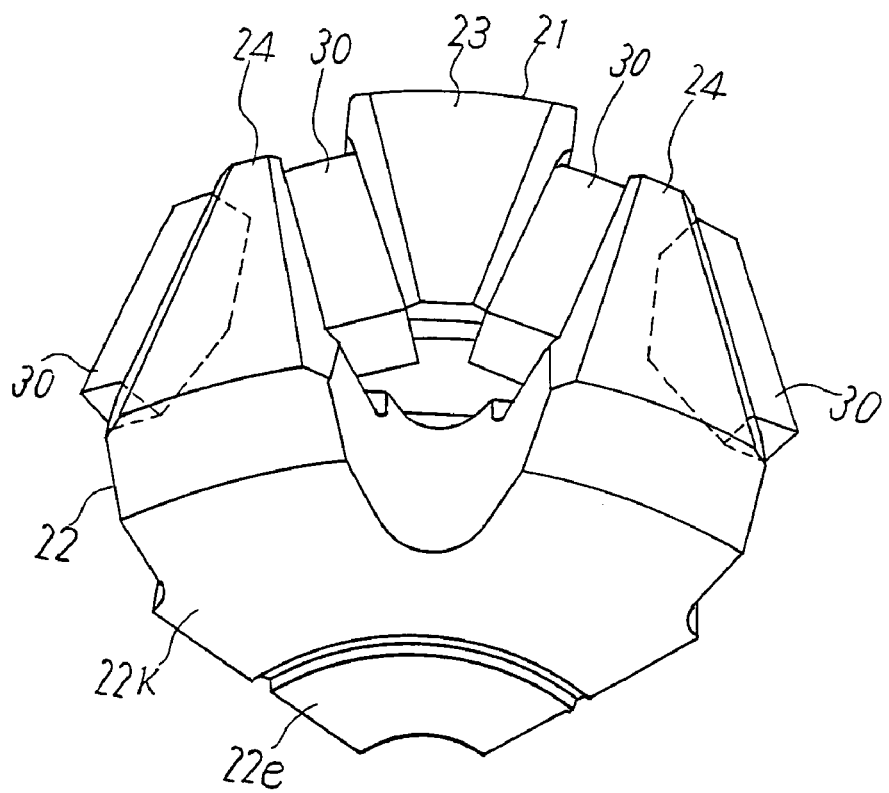
FIG. 1 is a perspective view of an essential part of a rotor of an electric rotating machine according to Embodiment 1 of the present invention.

FIG. 1 is a perspective view showing a rotor incorporated and used in an electric rotating machine. As shown in FIG. 1, this rotor includes: a pole core comprised of a first pole core 21 and a second pole core 22 respectively having claw-shaped magnetic poles 23, 24 protruding like an alternate engagement with each other; and a permanent magnet 30 disposed between the claw-shaped magnetic poles 23, 24 on both sides thereof. The permanent magnet 30 acts to reduce leakage of magnetic flux between the claw-shaped magnetic poles 23, 24 adjacent to each other. The pole core is formed covering with a rotor coil as described later. The rotor is comprised of the pole core and a rotor winding described later.

FIGS. 2(a) and (b) are a side view and a sectional view of the permanent magnet 30 according to Embodiment 1 of the invention. FIG. 2(a) shows a side view of the permanent magnet 30, and FIG. 2(b) shows a sectional view taken along the line A—A. As shown in FIG. 2(b), surface of the permanent magnet 30 is coated with a coating layer 31.

Figure 2:
FIGS. 2(a) and (b) are a side view and a sectional view of a permanent magnet according to Embodiment 1.
Figure 2:
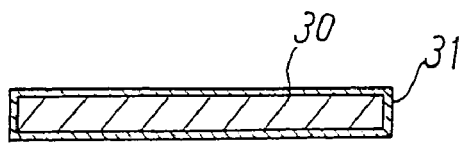
Figure 3:
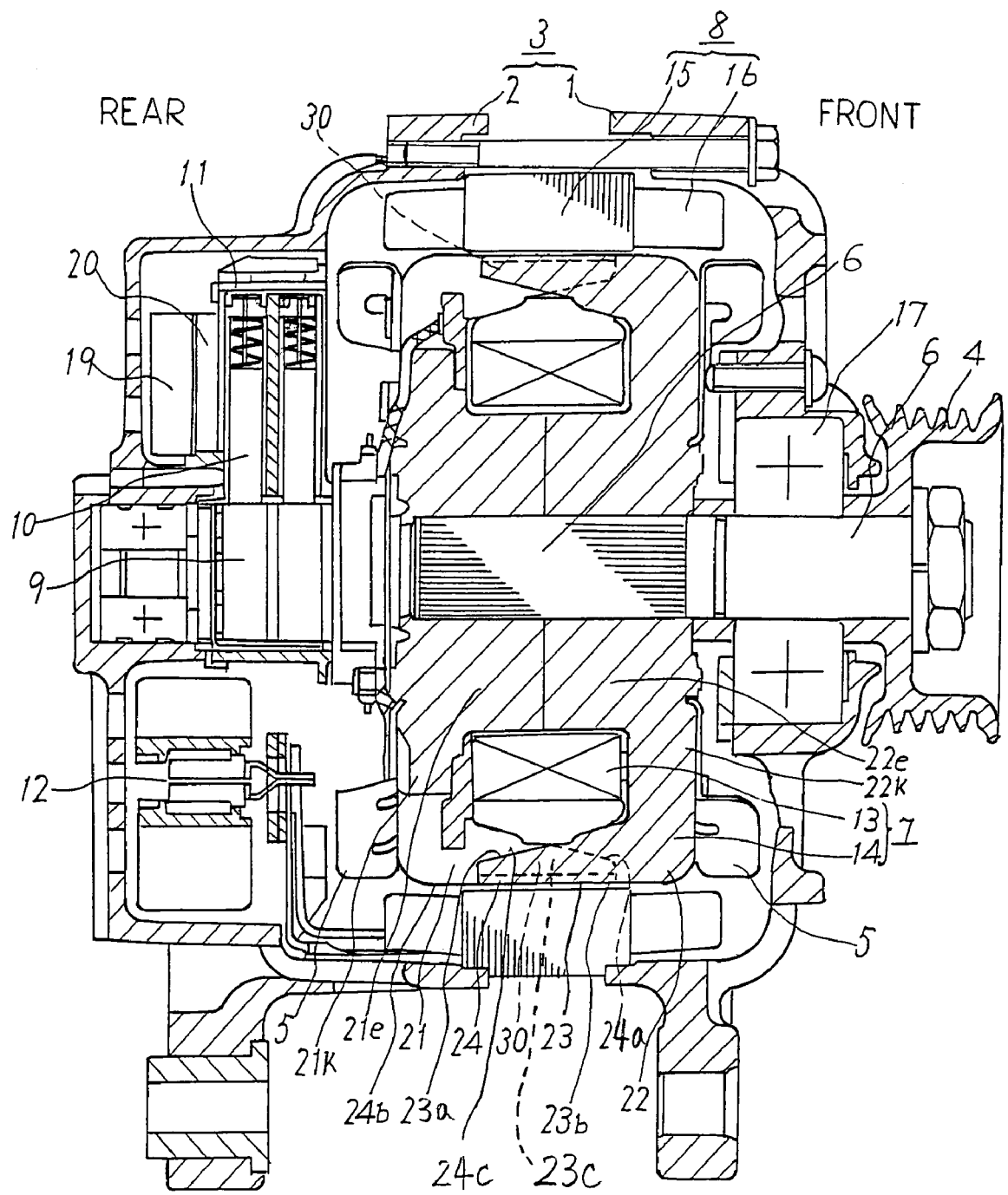
FIG. 3 is a sectional side view of the electric rotating machine according to Embodiment 1.

FIG. 3 is a sectional side view showing a sectional structure of the electric rotating machine that includes the rotor, in which the permanent magnet 30 shown in FIGS. 2(a) and (b) is incorporated, as a component.

As shown in FIG. 3, this electric rotating machine includes: a case 3 comprised of a front bracket 1 and rear bracket 2 made of aluminum; a shaft 6 that is disposed in the case 3, to one end of which a pulley 4 is fixed, and on the outer periphery of which a bearing 17 is disposed; a claw pole type rotor 7 fixed to the shaft 6; a fan 5 fixed to two end faces of the rotor 7; a stator 8 fixed onto an inner wall of the case 3; slip spring 9 that supplies a current to the rotor 7 fixed to the other end of the shaft 6; a pair of brushes 10 sliding on the slip spring 9; a brush holder 11 accommodating the brush 10; a rectifier 12 that is electrically connected to the stator 8 and rectifies ac generated at the stator 8 to dc; heat sink 19 fitted to the brush holder 11; and a regulator 20 that is joined to the heat sink 19 and regulates level of the ac voltage generated at the stator 8.

The rotor 7 includes: a cylindrical rotor winding 13 that generates magnetic flux by application of a current; and a pole core 14 that is disposed coating the rotor winding 13 and in which magnetic pole is formed by the magnetic flux. The shaft 6 extends and is disposed at the center of the rotor 7. The stator 8 disposed in an opposite and surrounding manner with a small space between itself and the rotor 7 includes: a stator core 15 and a stator winding 16 that is wound round on the stator core 15 and generates ac according to variation in magnetic flux from the rotor winding 13 following the rotation of the rotor 7. The pole core 14 is comprised of a first pole core 21 and a second pole core 22 forming a pair of cores alternately protruding. The first pole core 21 and the second pole core 22 are usually made of iron, and comprised of cylindrical parts 21e, 22e on which the rotor winding 13 is wound round and disk-shaped base parts 21k, 22k from which the cylindrical parts 21e, 22e are protruded.

On the outer edge of the base parts 21k, 22k, there are provided a plurality of claw-shaped magnetic poles 23, 24 engaging with each other at the location between outer periphery of the rotor winding 13 and inner periphery of the stator 8. The mentioned claw-shaped magnetic poles 23, 24 are larger in thickness and width on the base parts 21k, 22k sides, and are and smaller in thickness and width (tapered) on the tip end sides. Internal diameter side 23a, 24a of the claw-shaped poles 23, 24 are inclined and becomes gradually smaller in thickness as goes to the tip end. Outer periphery sides 23b 24b are arc-shaped along the internal diameter side of the stator 8. The claw-shaped magnetic poles 23, 24 have two trapezoidal sides 23c, 24c with respect to the circumferential direction of the rotor 7. Since the claw-shaped magnetic poles 23, 24 are alternately engaged with their tip ends opposite, the inclined internal diameter sides 23a, 24a of the claw-shaped magnetic poles 23, 24 form a row alternately. Further, the sides 23c, 24c of the claw-shaped magnetic poles 23, 24 are inclined to the center of the claw-shaped magnetic poles 23, 24 so that extending parts are smaller (tapered) as going to the tip end sides.

Now operations are hereinafter described. First, a current is supplied from a battery not shown to the rotor winding 13 via the brush 10 and the slip spring 9, whereby magnetic flux is generated. Thus S-pole is polarized on the claw-shaped magnetic pole 23 of the first pole core 21, and N-pole is polarized on the claw-shaped magnetic pole 24 of the first pole core 22. S and N can be changed. In the meantime, the torque of the engine rotates the pulley 4, and the rotor 7 is rotated with the shaft 6, thus an electromotive force being generated in the stator winding 16. This ac electromotive force is rectified to dc through the rectifier 12, level of the current being regulated by the regulator 20, and a battery is charged with the dc.

Any inverter for inverting dc to ac can be preferably used instead of the rectifier 12 rectifying ac to dc. In this case, the current is supplied to respective ac terminals, thereby the inverter performing a function as a motor.

In the rotor 7 of the electric rotating machine according to this Embodiment 1, as shown in FIG. 2, the permanent magnet 30 forming the rotor 7 is coated with an anticorrosive material (coating layer 31) performing a sacrificial anticorrosion. The permanent magnet 30 is mainly composed of iron. However, since the surface of the permanent magnet 30 is coated with an anticorrosive material performing a sacrificial anticorrosion, even if the rotor is damaged in the process of assembling the rotor or in the event of mixture of foreign matter from outside, the permanent magnet 30 is hardly rusted. In this regard, for example, a zinciferous inorganic material is preferably employed as an anticorrosive material performing a sacrificial anticorrosion. In that case, spray coating can form the coating layer 31. Thickness of the coating layer 31 is preferably in the range of 5 to 25 μm.

The sacrificial anticorrosion is defined as follows. For example, in the case of plating iron with zinc, even if the plating should be damaged, the zinc electrochemically melts prior to the iron (because ionization tendency of zinc is larger than that of iron), and the iron is prevented fro being corroded. Furthermore, as a result of rusting zinc, a film of zinc hydroxide coats the surface of the iron, thereby the iron being protected. In this manner, by coating the surface of the permanent magnet 30 mainly composed of iron with the anticorrosive coating layer 31 containing zinc, it is possible to protect the permanent magnet 30.

Although zinciferous inorganic material is employed as an example of the anticorrosive material, it is preferable to employ any other coating layer 31 that electrochemically melts prior to the iron to perform the protection of iron. For example, coating with any coating material containing zinc or galvanization (zinc plating) will be useful. Also in such a case, since at least the permanent magnet 30 is coated with the anticorrosive layer 31 containing zinc, an effect of the sacrificial anticorrosion can be exhibited, and it is possible to protect the permanent magnet 30. Further, other than zinc, nickel and aluminum also have a larger ionization tendency than iron to the extent of performing the sacrificial anticorrosion, it is preferable to coat mixing this metal material.

As a further anticorrosive material, any inorganic material performing the sacrificial anticorrosion can be employed. In such a case, surface coating can be carried out without unevenness as compared with coating with organic material such as resin, and an advantage is obtained such that the permanent magnet 30 is very difficult to rust.

It is preferable that, a varnish layer is further formed on the coating layer 31, with which the permanent magnet 30 is coated as mentioned above, by painting, impregnation or the like. In such a case, any minute gap or void between the permanent magnet 30 and the claw-shaped magnetic poles 23, 24 is charged with the varnish. As a result, cooling efficiency can be improved, and lowering of magnetic flux density of the permanent magnet 30 due to heat is reduced. For example, a theic-modified polyester is suitably adopted as the varnish.

By the arrangement of the permanent magnet 30 between the claw-shaped magnetic poles 23, 24 as shown in FIG. 1, leakage flux between the claw-shaped magnetic poles 23, 24 adjacent to each other can be largely reduced, and quantity of effective magnetic flux flowing from outer periphery of each claw-shaped magnetic poles 23, 24 to the stator core 15 side increases in proportion to such reduction in leakage flux or more than that. Consequently, maximum output current is improved.

Further, since the permanent magnet 30 is disposed between the claw-shaped magnetic poles 23, 24 adjacent to each other in the rotating direction, cooling air produced by the fan is easy to flow in V-shaped groove portions formed between shoulder parts of the pole cores 21, 22 and continuous claw-shaped magnetic poles 23, 24, thus cooling effect being also improved. It is certain that rust is easy to come out due to penetration of humidity of outside air or salt water, but as described above, since the surface of the permanent magnet 30 is coated with an anticorrosive material performing a sacrificial anticorrosion, the advantage of rust preventive effect on the permanent magnet 30 is more valuable.

Furthermore, by forming the coating layer 31 on the permanent magnet 30, tight contact with the adjacent magnetic pole (23 or 24) is improved as compared with any arrangement not forming the coating layer 31, and it is possible to transfer heat efficiently from the permanent magnet 30 to the magnetic poles.

Embodiment 2.

Figure 4:
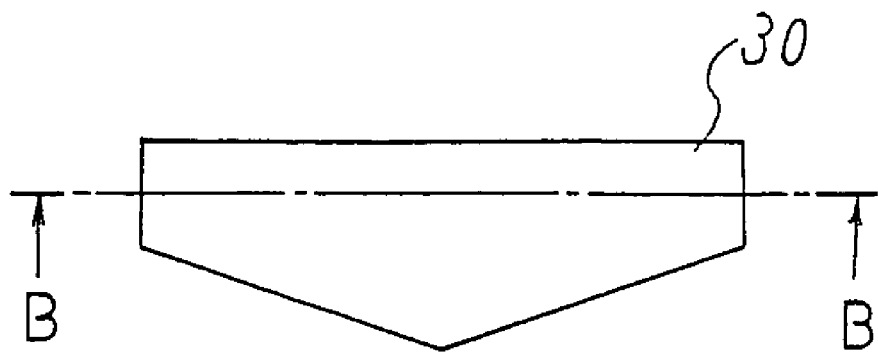
FIGS. 4(a) and (b) are a side view and a sectional view of a permanent magnet according to Embodiment 2.
Figure 4:
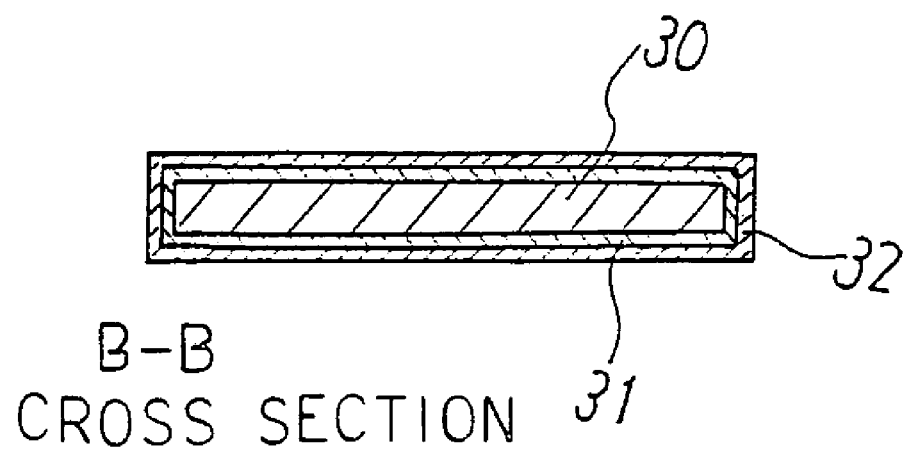

An example of coating the permanent magnet 30 forming the rotor is coated with a single coating layer 31 is shown in the foregoing Embodiment 1. Now, as shown in a side view of FIG. 4 (a) and a sectional view of FIG. 4(b) taken along the line B—B of FIG., 4(a), an example of coating with the anticorrosive material forming a multi-layer structure (two-layer structure in the example of FIG. 4) is described in this Embodiment 2.

The multi-layer structure is formed by nickel plating and zinciferous inorganic material coating, and the nickel plating forms either a nickel plating layer (lower layer) 31 or a coating layer (upper layer) 32. Otherwise, the multi-layer structure is formed by aluminum plating and zinc plating, and the aluminum plating forms either an aluminum plating layer (lower layer) 31 or a coating layer (upper layer) 32. In other words, a two-layer structure is established irrespective of coating order of the nickel plating layer and zinciferous inorganic material coating layer or irrespective of coating order of aluminum plating layer and zinc plating layer. As a result, since the surface of the permanent magnet 30 is coated with an anticorrosive material, even if the rotor is damaged in the process of assembling the rotor or in the event of mixture of foreign matter from outside, the permanent magnet 30 is hardly rusted.

Each of the coating layers 31, 32 is formed to be 5 to 25 μm in thickness. Film of the nickel plating layer is formed by nickel electroless plating or nickel electrolytic plating, film of zinciferous inorganic material coating layer is formed by spraying, and film of zinc plating layer (or aluminum coating layer) is formed by hot-dip zinc plating (or hot-dip aluminum coating).

The multi-layer structure is preferably formed of three layers, also irrespective of coating order of the coating layers.

The rotor cooling efficiency can be improved by further forming a varnish layer on the upper layer after coating the surface of the permanent magnet 30 with the anticorrosive material of multi-layer structure.

Further, it is preferable that the permanent magnet 3-0 is coated with the anticorrosive material of multi-layer structure. In the same manner as in the foregoing Embodiment 1, heat conduction from the permanent magnet 30 to the adjacent magnetic pole (23 or 24) is improved and lowering of magnetic flux density due to heat is reduced, as compared with the arrangement not coated with the anticorrosive material of multi-layer structure.

Embodiment 3.

Figure 5:
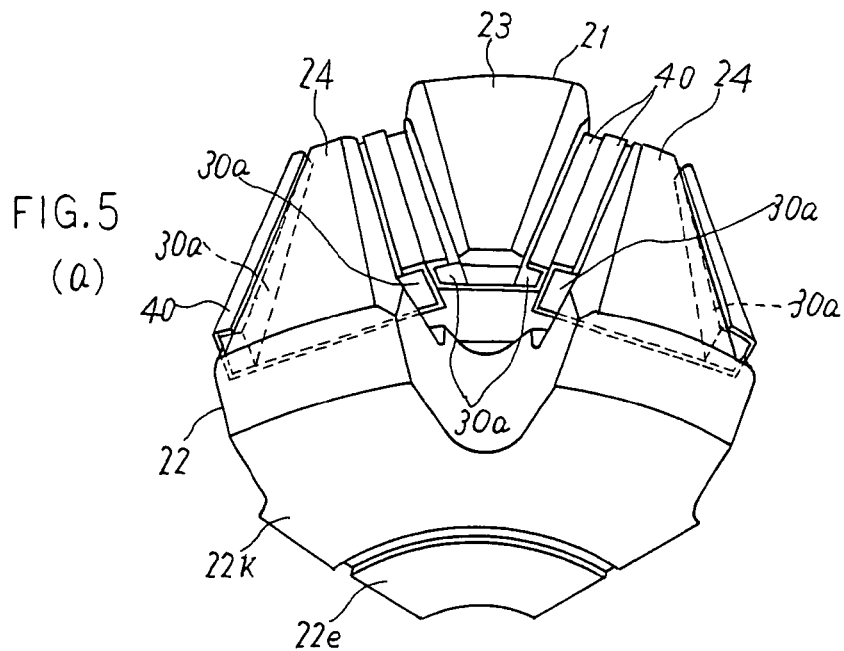
FIGS. 5(a), (b) and (c) are a perspective view of an essential part of a rotor, an exploded view of the essential part, and a developed view of a holding member of an electric rotating machine according to Embodiment 3 of the present invention.
Figure 5:
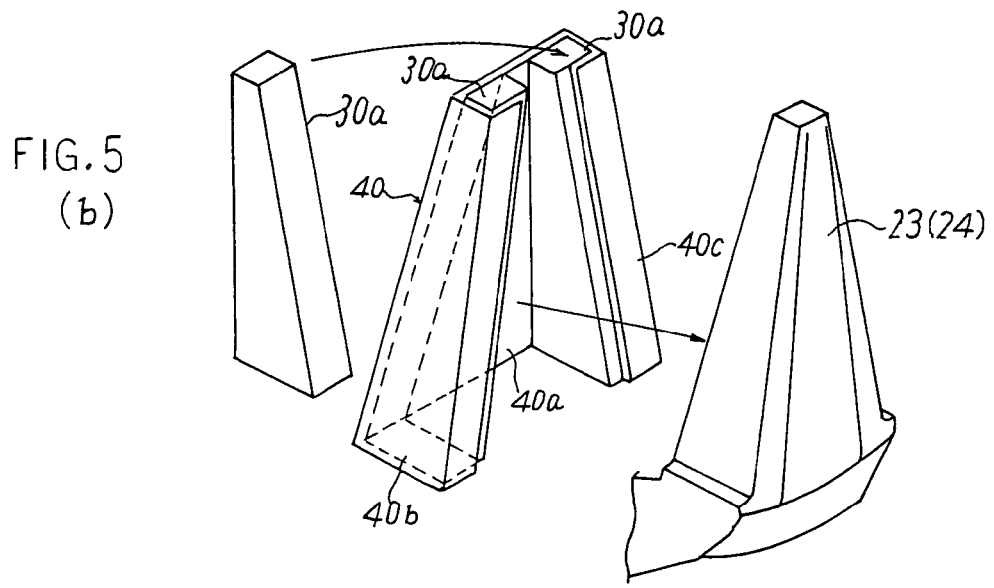
Figure 5:
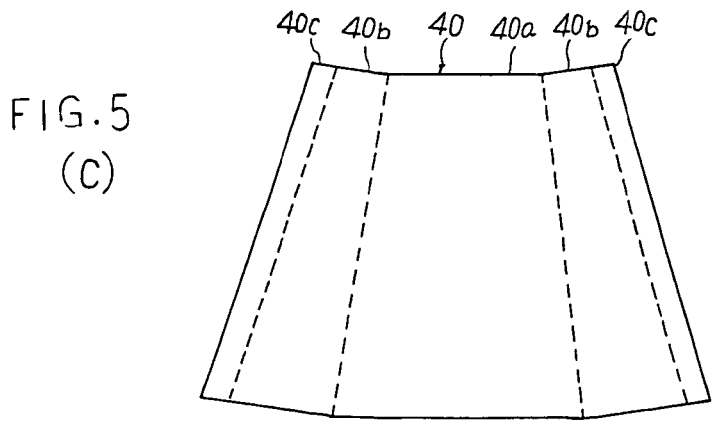

An example of disposing each one permanent magnet 30 between the claw-shaped magnetic poles 23, 24 is shown in the foregoing Embodiment 1 and Embodiment 2. Now in this Embodiment 3, an example of disposing two permanent magnets 30a respectively on two sides of one claw-shaped magnetic pole 23 (24) (in other words, two permanent magnets 30a between the claw-shaped magnetic poles 23, 24) is described. As shown in FIG. 5(a) being a perspective view of an essential part of the rotor, FIG. 5(b) being an exploded view of the essential part and FIG. 5(c) being a developed view of a holding member for holding the permanent magnets 30a, the permanent magnets 30a are disposed on each side of each claw-shaped magnetic pole 23, 24, and the permanent magnets 30a are held on the claw-shaped magnetic pole 23 (24) by means of a metallic holding member 40.

As shown in FIGS. 5(a), (b) and (c), the holding member 30 holds the two permanent magnets 30a disposed on both sides of the claw-shaped magnetic pole 23 (24) in such a manner as to enclose with two ends of a trapezoidal part 40a, bent part 40a and a holding part 40c of the holding member 40.

In addition, the surface of the permanent magnets 30a is coated with the coating layers 31, 32 and/or the varnish layer described in the foregoing Embodiments 1 and 2.

As a result of above arrangement, size of each permanent magnet 30a can be smaller and a centrifugal force of the permanent magnets 30a applied on the holding member 40 is smaller, and therefore durability is improved. Further, as the permanent magnets 30a can be formed conforming to the side dace of the claw-shaped magnetic pole 23 (24), it is possible to utilize efficiently the effect of the permanent magnets 30a. Since the size of the permanent magnets 30a can be smaller, material cost of the permanent magnets 30a can be reduced. Furthermore, almost all surface portion of the permanent magnets 30 is covered with the holding member 40, water is hardly enter in the permanent magnets 30a, and the permanent magnets 30a is successfully prevented from being rusted.

Embodiment 4.

Figure 6:
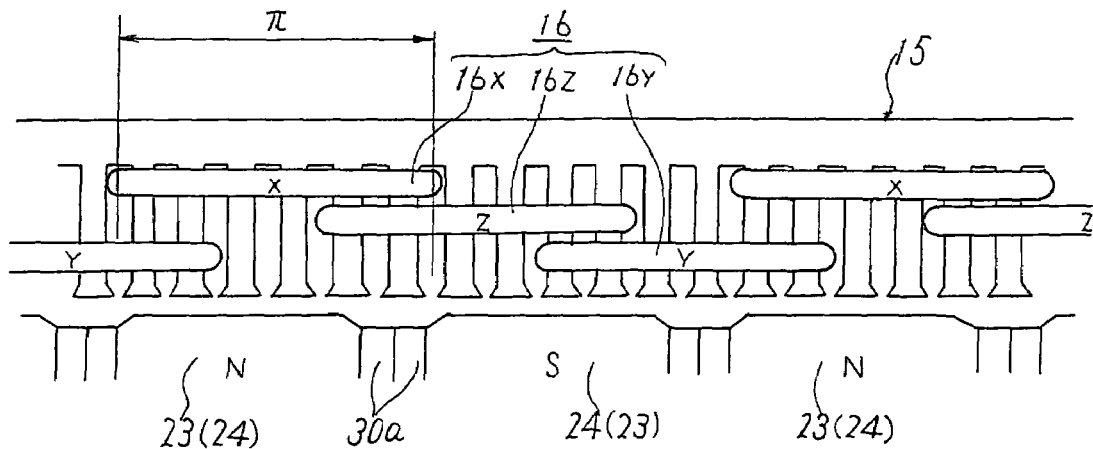
FIG. 6 is a schematic view of a stator winding according to Embodiment 4.

FIG. 6 shows a stator winding 16 forming the stator 8 disposed along the outer circumference of the rotor 7 of the electric rotating machine described above. This stator winding 16 is, as shown in FIG. 6, wound round twice for each pole and each phase over the whole link (two slots for each pole and each phase. Slot is a groove through which a winding formed on the core side passes.).

The conventionally known stator winding is wound round in the form of one slot for each pole and each phase, and distribution of magnetomotive force by single-phase coil forms approximately a square that includes any higher harmonics of high order, and therefore any noise, torque ripple and the like are produced.

FIG. 6 is a schematic view taking stator teeth from one side (tooth-like protrusions forming the stator core 15. A groove between the tooth-like protrusions is referred to as slot), and shows a corresponding relation to the magnetic pole on the rotor side. In FIG. 6, reference numerals 16x, 16y, 16z indicate x-phase, y-phase and z-phase of the stator winding respectively.

In the electric rotating machine according to this embodiment, since the stator winding 16 is wound twice for each pole and each phase over the whole link, variation in permeance (index showing easiness in passage of magnetic flux) due to stator teeth becomes small and fine, eddy current is reduced, and heat generation on the rotor 7 side is suppressed. As a result, there is an advantage of preventing permanent deterioration of characteristics due to irreversible demagnetization.

Embodiment 5.

Figure 7:
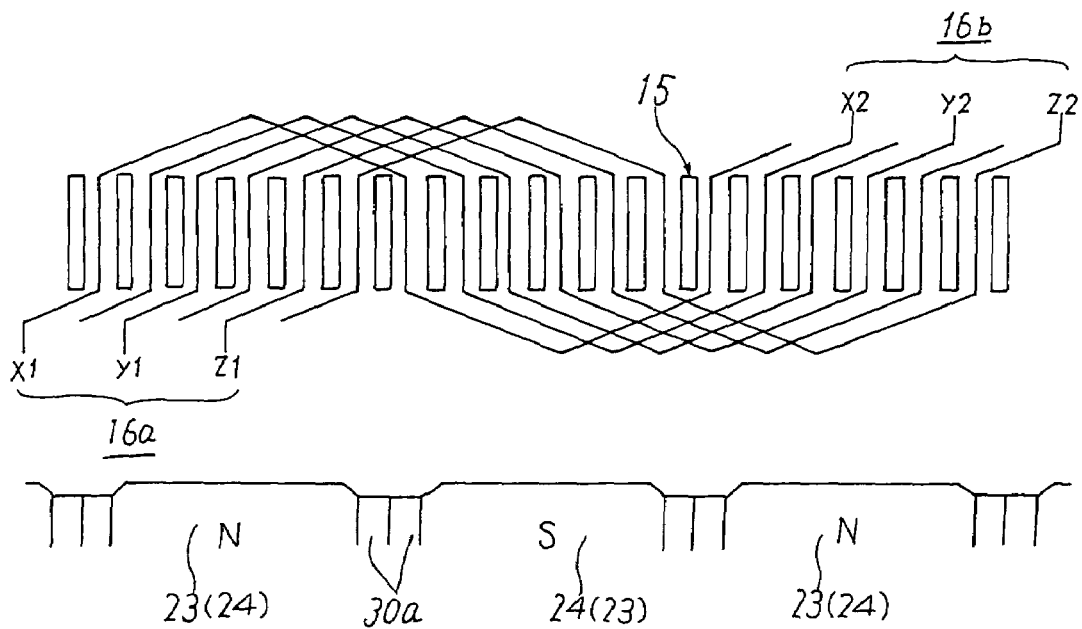
FIG. 7 is a schematic view of a stator winding according to Embodiment 5.

FIG. 7 is a winding diagram of the stator winding 16, and in which the stator teeth viewed from underside of FIG. 6 correspond to the magnetic pole on the rotor side. As shown in FIG. 7, the stator winding 16 (comprised of 16a and 16b wound round twice for each pole and each phase over the whole link) includes: a first three-phase connection coil 16a in which three-phase connection coil 16a, three-phased plural stator coils x1, y1 and z1 are wound round on the stator core 15 over the whole link; plural stator coils x2, y2 and z2 connected to the first three-phase connection coil 16a on the same winding conditions; and a second three-phase connection coil 16b in which each of the stator coils x2, y2 and z2 is wound round on the stator core 15 over the whole link with a displacement of 27.5 degrees in electrical angle with respect to each of the stator coils x1, y1 and z1 of the first three-phase connection winding coil 16a.

As magnetomotive force higher harmonic provided by two windings forming a pair superimposes each other with a phase difference, any composite magnetomotive force higher harmonic acting on the permanent magnet 30a (or 30) can be reduced. In this manner, temperature rise of the rotor magnetic pole and the permanent magnet 30a (30) due to composite magnetomotive force higher harmonic can be reduced, making it possible to prevent permanent deterioration of characteristics due to irreversible demagnetization.

Embodiment 6.

Figure 8:
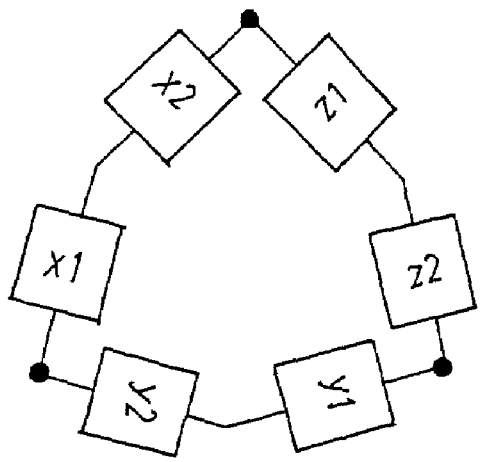
FIG. 8 is a schematic view of a stator winding according to Embodiment 6.

It is also preferable that, as shown in FIG. 8, the first three-phase connection winding coil 16a (indicated by reference numerals x1, y1 and z1) and the second three-phase connection coil 16b (indicated by reference numerals x2, y2 and z2) respectively described in the foregoing Embodiment 5 are delta-connected forming zigzag (connection with a phase difference). Blocks such as x1, x2 and so on show schematically the coil, and connection line between one block and another is a wire. Since the stator winding 16 is formed by three phases, any rectification circuit and inverter can be arranged at a reasonable cost. Furthermore, since the magnetomotive force higher harmonic by two windings forming a pair superimposes each other with a phase difference, any composite magnetomotive force higher harmonic acting on the permanent magnet 30a (or 30) can be reduced. In this manner, temperature rise of the rotor magnetic pole and the permanent magnet 30a (30) due to composite magnetomotive force higher harmonic can be reduced, making it possible to prevent permanent deterioration of characteristics due to irreversible demagnetization.

Embodiment 7.

Figure 9:
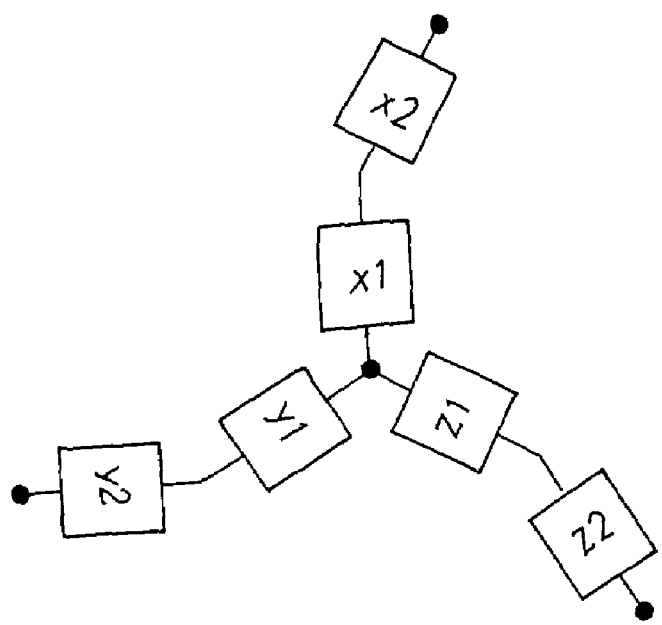
FIG. 9 is a schematic view of a stator winding according to Embodiment 7.

It is also preferable that, as shown in FIG. 9, the first three-phase connection winding coil 16a (indicated by reference numerals x1, y1 and z1) and the second three-phase connection coil 16b (indicated by reference numerals x2, y2 and z2) respectively described in the foregoing Embodiment 5 are Y-connected forming zigzag (connection with a phase difference) Since the magnetomotive force higher harmonic by two windings forming a pair superimposes each other with a phase difference, any composite magnetomotive force higher harmonic acting on the permanent magnet 30 can be reduced. In this manner, temperature rise of the rotor magnetic pole and the permanent magnet 30a (30) due to composite magnetomotive force higher harmonic can be reduced, making it possible to prevent permanent deterioration of characteristics due to irreversible demagnetization.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An electric rotating machine comprising:
   a rotor provided with a rotor coil for generating magnetic flux; a pole core comprised of a first pole core and a second pole core respectively provided covering said rotor coil and each having claw-shaped magnetic poles protruding in an alternate engagement with each other; and a permanent magnet disposed on two sides of said claw-shaped magnetic poles, and reducing leakage of magnetic flux between sides of said claw-shaped magnetic poles adjacent to each other; and
   a stator disposed oppositely to said rotor via a space;
   wherein said permanent magnet is coated with an anti-corrosive material performing a sacrificial anticorrosion function and having a varnish layer coated over said anticorrosive material.

2. A rotor for an electric rotating machine comprising:
a rotor provided with a rotor coil;
a pole core comprised of a first pole core and a second pole core each having claw shaped magnetic poles in an alternate engagement with one another; and
a permanent magnet disposed on both sides of each claw-shaped magnetic pole,
wherein said permanent magnet is coated with a first sacrificial anticorrosive material and a second sacrificial anticorrosive material.

3. The rotor according to claim 2, wherein the first sacrificial anticorrosive material comprises one of a zinciferous material, a nickel plating and an aluminum plating.

4. The rotor according to claim 2, wherein the second sacrificial anticorrosive material comprises one of a zinciferous material, a nickel plating and an aluminum plating.

5. The rotor according to claim 2, wherein the first sacrificial anticorrosive material and the second sacrificial anticorrosive material comprise one of a zinciferous material and a nickel plating, and a zinciferous material and an aluminum plating.

6. The rotor according the claim 2, further comprising a varnish layer disposed over the first and second sacrificial anticorrosive materials.

7. The rotor according the claim 2, further comprising a holding member that secures the two magnets disposed on both sides of each claw-shaped magnetic pole.

8. The rotor according the claim 7, wherein the holding member is made of a metallic material.

* * * * *